United States Patent
Mecklenbraeuker et al.

(10) Patent No.: US 7,526,307 B1
(45) Date of Patent: Apr. 28, 2009

(54) STOCHASTIC TRANSMISSION POWER LEVEL ADJUSTMENT IN A RANDOM ACCESS CHANNEL IN A RADIO COMMUNICATIONS SYSTEM AND METHOD

(75) Inventors: Christoph Mecklenbraeuker, Vienna (AT); Peter Slanina, Judenau (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 09/959,215

(22) PCT Filed: Apr. 4, 2000

(86) PCT No.: PCT/DE00/01034

§ 371 (c)(1),
(2), (4) Date: Jan. 23, 2002

(87) PCT Pub. No.: WO00/65745

PCT Pub. Date: Nov. 2, 2000

(30) Foreign Application Priority Data

Apr. 22, 1999 (DE) ................................ 199 18 371

(51) Int. Cl.
*H04Q 7/20* (2006.01)
(52) U.S. Cl. ................... 455/522; 455/450; 370/329
(58) Field of Classification Search ............... 455/13.4, 455/522, 512, 404.2, 450, 552, 69; 370/318, 370/328, 329
See application file for complete search history.

(56) References Cited

U.S. PATENT DOCUMENTS

| 5,430,760 | A | * | 7/1995 | Dent | ........................... | 375/144 |
| 5,530,918 | A | * | 6/1996 | Jasinski | ...................... | 340/7.25 |
| 5,815,801 | A | * | 9/1998 | Hamalainen et al. | ........ | 455/63.1 |
| 5,859,839 | A | * | 1/1999 | Ahlenius et al. | ............ | 370/252 |

(Continued)

FOREIGN PATENT DOCUMENTS

DE 197 23 090 A1 12/1998

(Continued)

OTHER PUBLICATIONS

"On the randomization of transmitter power levels to increase throughput in multiple access radio systems" by Richard O. LaMaire et al., *Wireless Networks*, Apr. 1998, pp. 263-277 (XP-000750446).

(Continued)

*Primary Examiner*—Nhan T Le
(74) *Attorney, Agent, or Firm*—K&L Gates LLP

(57) ABSTRACT

A number of subscriber stations use a random access channel in an uncoordinated manner and transmit signals in the channel at a transmission power level which is set on the basis of a random principle. Deterministic transmission power level control is replaced by stochastic transmission power level control. For repeated transmission from two subscriber stations, it is improbable that both will once again transmit at the same transmission power level. If collisions occur between two transmissions which do not now have the same received power level at the base station, then, providing the power level difference is sufficient, at least the more powerful signal can be evaluated (capture effect) and only the transmission of the weaker power level signal need be repeated. Thus, on average, this reduces the delay before successful reception of the transmissions.

9 Claims, 4 Drawing Sheets

U.S. PATENT DOCUMENTS

| | | | |
|---|---|---|---|
| 5,930,684 A * | 7/1999 | Keskitalo et al. | 455/69 |
| 5,983,112 A * | 11/1999 | Kay | 455/504 |
| 6,035,208 A * | 3/2000 | Osawa | 455/522 |
| 6,101,179 A * | 8/2000 | Soliman | 370/342 |
| 6,249,515 B1 * | 6/2001 | Kim et al. | 370/337 |
| 6,351,651 B1 * | 2/2002 | Hamabe et al. | 455/522 |
| 6,539,236 B2 * | 3/2003 | Hakkinen et al. | 455/525 |
| 6,574,456 B2 * | 6/2003 | Hamabe | 455/63.3 |
| 6,587,672 B1 * | 7/2003 | Chuah et al. | 455/69 |
| 6,628,956 B2 * | 9/2003 | Bark et al. | 455/522 |

FOREIGN PATENT DOCUMENTS

| | | |
|---|---|---|
| DE | 198 17 771 A1 | 11/1999 |
| EP | 0 674 402 A1 | 9/1995 |
| WO | WO 97/46041 | 12/1997 |

OTHER PUBLICATIONS

"Variable Packet Aloha Networks" by Joseph T. McCartin et al., 1990 IEEE, pp. 360-365 (XP-000204140).

"On Improving Utilization in ALOHA Networks" by John J. Metzner, pp. 447-448 (XP-000809354).

"Modification of the current RACH scheme for increased throughput"; Source: Ericsson, Tdoc SMG2 UMTS-L1 455/98, pp. 1-5.

* cited by examiner

STOCHASTIC TRANSMISSION POWER LEVEL ADJUSTMENT IN A RANDOM ACCESS CHANNEL IN A RADIO COMMUNICATIONS SYSTEM AND METHOD

CLAIM FOR PRIORITY

This application claims priority to International Application No. PCT/DE00/01034 which was published in the German language on Apr. 4, 2000.

TECHNICAL FIELD OF THE INVENTION

The invention relates to a method and a subscriber station for signal transmission in a random access channel in a radio communications system.

BACKGROUND OF THE INVENTION

In radio communications systems, messages (for example voice, video information or other data) are transmitted by electromagnetic waves via a radio interface. The radio interface relates to a connection between a base station and subscriber stations, in which case the subscriber stations may be mobile stations or fixed-position radio stations. The electromagnetic waves are in this case transmitted at carrier frequencies which are in the frequency band intended for the respective system. For future radio communications systems, for example the UMTS (Universal Mobile Telecommunications System) or other 3rd generation systems, frequencies in the frequency band around 2000 MHz are envisaged.

A random access channel (RACH) in a radio communications system is distinguished since access to the channel is not coordinated. The mobile stations in a radio cell can use this channel without prior allocation in order, for example, to request subsequent allocation of radio resources, for example when setting up a connection.

However, uncoordinated access leads to collisions between the transmissions from individual mobile stations. When the transmissions from a number of mobile stations are superimposed at a receiving base station, the transmissions can no longer be detected. The mobile stations therefore do not receive any acknowledgement of the transmission.

After a collision, the mobile stations attempt to transmit via the random access channel. The more frequently access needs to be repeated, the longer the waiting time and the lower the level to which the efficiency of this access method falls.

DE 198 17 771 proposes that access blocks which are orthogonal with respect to one another in time be allowed, and that the probability of a collision be reduced by choosing one of a number of different access blocks. That is, different transmission times within the channel. A further option for improving the efficiency of the method has been disclosed in ETSI SMG2 UMTS L1 Expert Group, Tdoc SMG2 UMTS-L1 455/98, Oct. 14, 1998. This proposal is for the power level to be increased in steps. The mobile station starts at a transmission power level which is reduced to the normal power level setting, and increases the transmission power level in steps until the base station confirms reception.

These methods adjust the transmission power level purely deterministically so that the same collision problems occur repeatedly in the same scenario.

A method as claimed in the precharacterizing clause of claim 1 is described in WO 97 46041 A.

SUMMARY OF THE INVENTION

In one embodiment of the invention, there is a method for signal transmission in a random access channel in a radio communications system. The method includes, for example, transmitting signals via a random access channel in an uncoordinated manner with an adjustable transmission power level, wherein subscriber stations set the transmission power level, and a mean transmission power level is predetermined for a random number generator which sets the transmission power level.

In another aspect of the invention, a random principle is used for a subset of the first transmissions in the signal transmission.

In another aspect of the invention, the mean transmission power level is based on measured attenuation values in radio interface between a base station and the subscriber stations.

In yet another aspect of the invention, the attenuation levels are determined by evaluating the transmitted power level in an organization channel.

In another aspect of the invention, variance of the transmission power level in a number of transmission is predetermined for the random number generator which sets the transmission power level.

In another aspect of the invention, a correlation coefficient for the transmission power levels of a number of successive transmissions from one of the subscriber stations is predetermined for the random number generator which sets the transmission power level.

In still another aspect of the invention, the transmissions are sent as a request for allocation of radio resources, as an acknowledgement or as messages for updating a location of the subscriber stations.

In another aspect of the invention, the random access channel is a broadband channel and is organized on the basis of one of a TDD or FDD mode in a UMTS mobile radio system.

In another embodiment of the invention, there is a subscriber station for a radio communications system, the radio communications system having a random access channel which a number of subscriber stations use in an uncoordinated manner, comprising a transmission device for signal transmission in the random access channel, and a control device which sets the transmission power level for the signal transmission on the basis of a random principle, the mean transmission power level being predetermined for a random number generator which sets the transmission power level.

BRIEF DESCRIPTION OF THE DRAWINGS

Exemplary embodiments of the invention will be explained in more detail with reference to the attached drawings, in which.

DETAILED DESCRIPTION OF THE PREFERRED EMBODIMENTS

Figure 1:
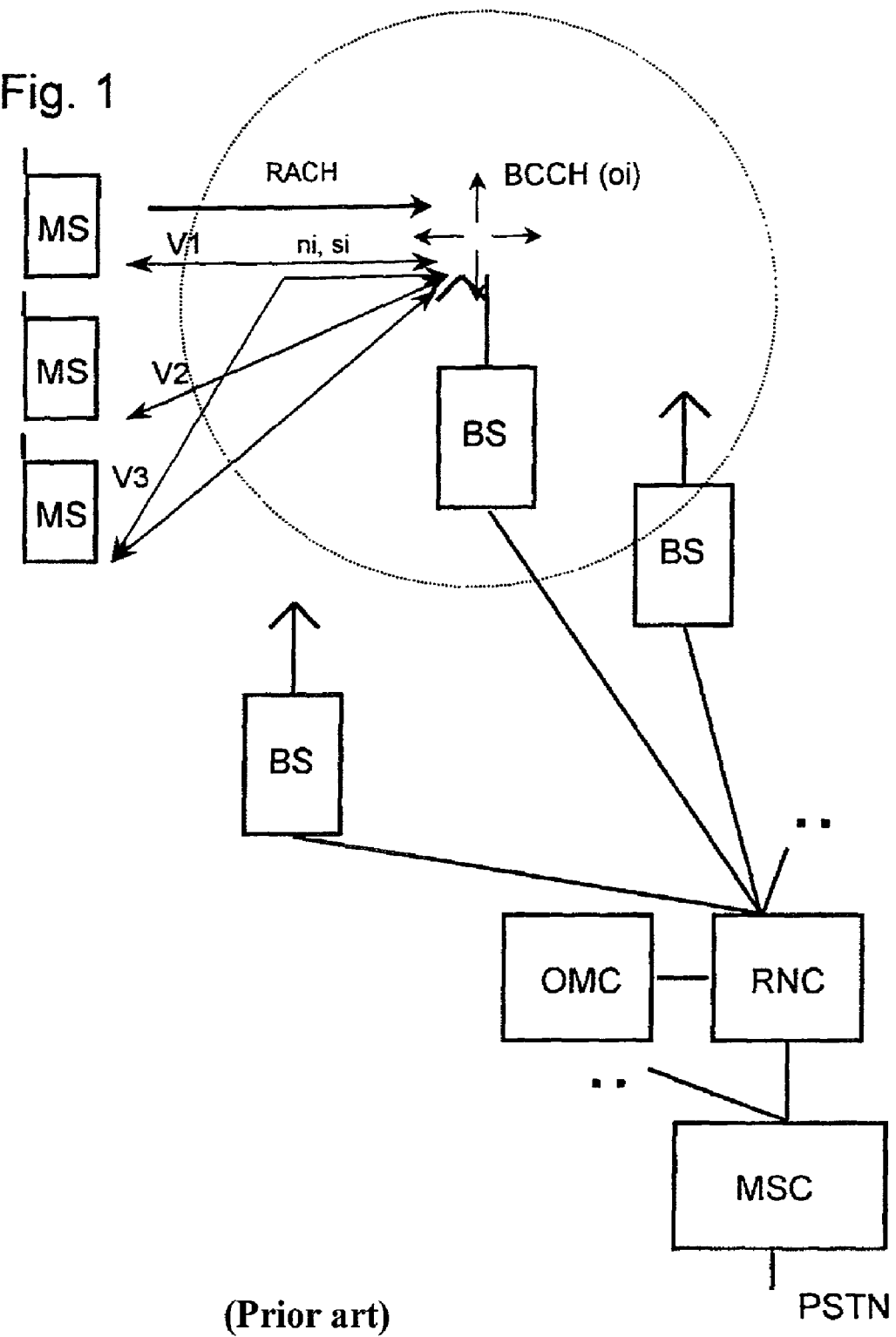
FIG. 1 shows a radio communications system.

The invention discloses improving the efficiency of signal transmission in the random access channel.

According to the invention, a number of subscriber stations use the random access channel in an uncoordinated manner, and transmit signals in this channel at a transmission power level which is set on the basis of a random principle. Deterministic transmission power level control is replaced by stochastic transmission power level control. For repeated transmission from two subscriber stations, it is improbable that both will transmit at the same transmission power level. If collisions occur between two transmissions which are no longer received with the same power level at the base station, providing the power level difference is sufficient. In this regard, at least the more powerful signal can be evaluated (capture effect) and the transmission of the weaker power level signal is repeated. On average, this reduces the delay before successful reception of the transmissions.

Particularly in the case of stationary subscriber stations, in which the same collision scenarios occur repeatedly, the invention provides better detection probability for at least one transmission from a subscriber station in an access block.

According to one advantageous embodiment of the invention, stochastic transmission power level control is used for a subset of transmissions or applications. Other transmissions or applications can be prioritized, for example, by setting a regularly increased transmission power level with respect to the probability of immediate detection. Such prioritization can be used for some applications, for example as a request for allocation of radio resources, as an acknowledgement or as a message for updating the location of the subscriber stations, or for a subset of the subscriber stations or a subset of services. This makes it possible for the operator of the radio communications system to differentiate within the applications, subscriber stations or services and, correspondingly, to promise better quality.

A random number generator which sets the transmission power levels using the random principle can, according to advantageous refinements of the invention, take account of specific distribution characteristics:

A mean transmission power level which, for example based on the attenuation of the radio interface—measured via the BCCH (broadcast control channel)—defines the desired mean value for randomly chosen transmission power levels.

The range of the possible discrepancy from the mean value is governed by any variance in the transmission power levels. The greater the variance, the greater the effectiveness of the "capture effects." However, the risk of no longer being able to detect an individual transmission power level is too low.

The correlation between successive transmissions provides a measure of the extent to which their transmission power levels can differ when the scenario is otherwise the same. Correlation coefficients are used to define parameters which define the level of stochastic control.

These distribution characteristics can be pre-set on a radio-cell-specific basis, and can be signaled to the subscriber stations. It is thus possible to optimize access to the random access channel, taking account of the specific characteristics of the radio cell.

The utilization of a resource unit in the radio resources of radio communications systems with broadband channels is particularly important, since the smallest resource unit is relatively large. The channels are organized on the basis of the TDD or FDD mode in a UMTS mobile radio system.

The mobile radio system illustrated in FIG. 1, as an example of a radio communications system, comprises a large number of mobile switching centers MSC which are networked with one another and produce the access to a land line network PSTN. Furthermore, these mobile switching centers MSC are each connected to at least one device RNC for controlling the base stations BS and for allocating radio resources, that is to say a radio resource manager. Each of these devices RSC in turn allows a connection to at least one base station BS. Such a base station BS can use a radio interface to set up a connection to a subscriber station, for example mobile stations MS or other types of mobile and stationary terminals. At least one radio cell is formed by each base station BS.

By way of example, FIG. 1 shows connections V1, V2, V3 for transmitting user information ui and signaling information as point-to-point connections between mobile stations MS and a base station BS, and an organization channel BCCH as a point-to-multipoint connection. Organization information oi is transmitted by the base station BS at a known constant transmission power level in the organization channel BCCH, and can be evaluated for all the subscriber stations MS. The information includes, for example, details about the services offered in the radio cell, the configuration of the channels in the radio interface and distribution characteristics of the transmission power level. In the uplink direction UL, one random access channel RACH is offered for the subscriber stations MS.

An operation and maintenance center OMC provides monitoring and maintenance functions for the mobile radio system, or for parts of it. The functionality of this structure can be transferred to other radio communications systems in which the invention can be used, in particular for subscriber access networks with wire-free subscriber connection and for base stations and subscriber stations operated in the unlicensed frequency band.

The invention will be explained in the following text on the basis of a mobile radio system having a radio interface using the TDD transmission method (time division duplex), although it is likewise possible to use the FDD transmission method (frequency division duplex).

Figure 2:
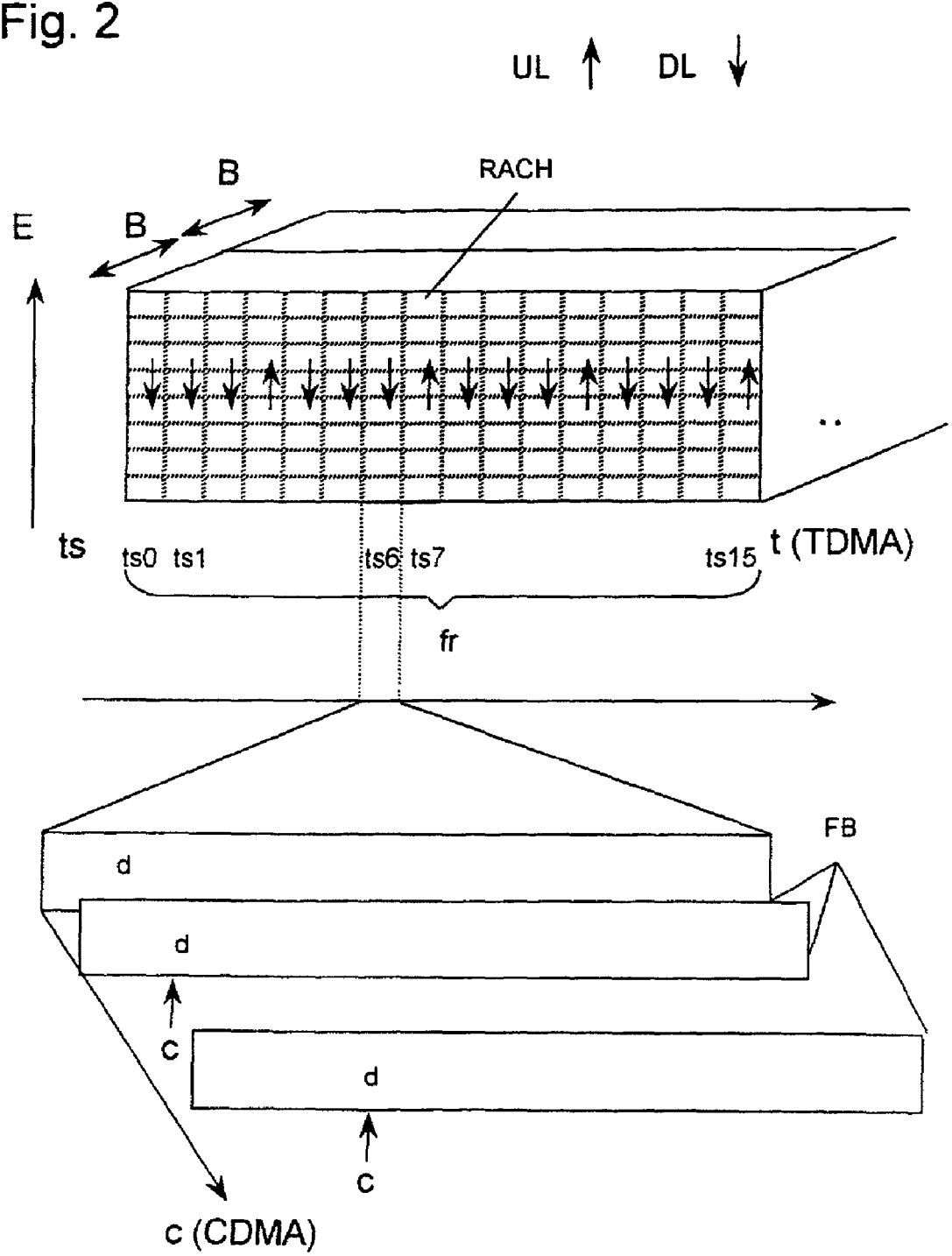
FIG. 2 shows a TDD radio interface.

The frame structure of a TDD radio transmission can be seen in FIG. 2. A broad frequency band, for example with a bandwidth of B=5 MHz, is split in accordance with a TDMA component (time division multiple access) into a number of timeslots ts of equal time duration, for example with 16 timeslots ts0 to ts15 being provided per frame fr. Some of the timeslots ts are used in the downlink direction DL, and some of the timeslots are used in the uplink direction UL. In this TDD transmission method, the frequency band for the uplink direction UL corresponds to the frequency band for the downlink direction DL.

Information from a number of connections is transmitted in bursts FB within one timeslot ts6. The data d is spread on a connection-specific basis with a fine structure, a spread code c, so that, for example, n connections can be separated at the receiving end by means of this CDMA component (code division multiple access).

One timeslot ts7, in the uplink direction UL, is used as the random access channel RACH, which the mobile stations MS can use for access in an uncoordinated manner. This random, uncoordinated access can be used for at least the following applications:

initial access for setting up a connection,
  transmission of small data packets,
  transmission of an acknowledgement of data packets received,
  request from the mobile station MS for allocation of radio resources during a connection, and/or
  updating the location of the mobile station MS in what is referred to as the "idle state".

Although the mobile stations MS use the random access channel RACH in an uncoordinated manner, the transmission power level is controlled. This is done by measuring the attenuation levels (path loss) in advance. The attenuation levels can advantageously be determined by evaluating the received power level in the organization channel BCCH, see FIG. 3. The organization channel BCCH is accessible all the time, and transmits at a known transmission power level.

The measured received power level in the mobile station MS and the transmission characteristics allow a control device, which is in the form of a random number generator, in the mobile station MS to calculate the transmission power level (required for a specific received power level in the base station BS) for a transmission device in the mobile station MS based on a random principle. The transmission characteristics are predetermined cell-by-cell, by notification in the organization channel BCCH, and include the mean transmission power level, variance and correlation coefficient. The mean value of the transmission power level is based on the attenuation, that is to say on the received power level in the organization channel BCCH at the mobile station MS. The lower the power level received at the mobile station MS, the higher the mean value must be chosen to be in the uplink direction UL.

Figure 3:
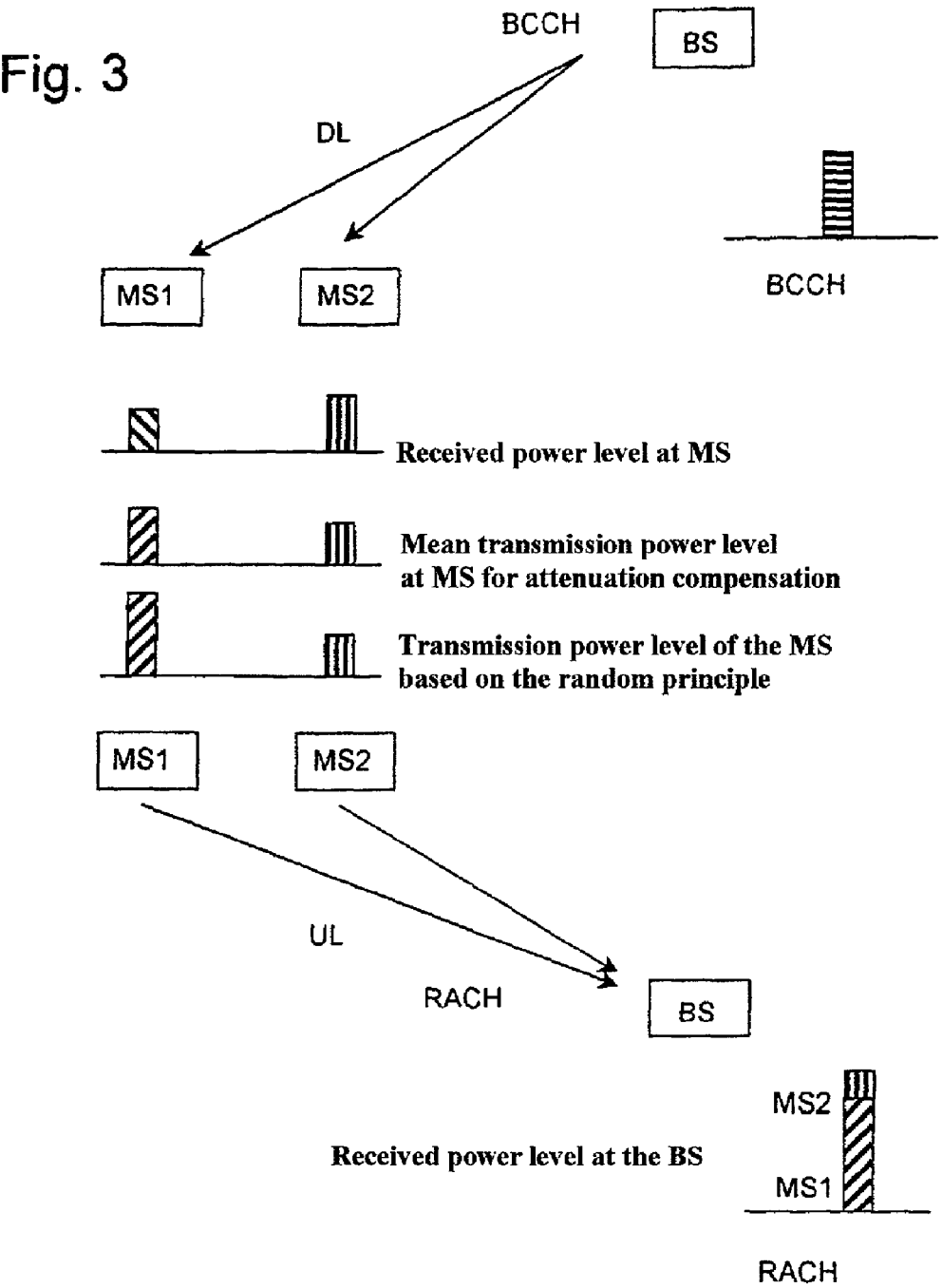
FIG. 3 shows a transmission power level adjustment.

In FIG. 3, the random selection of the transmission power level means that the first mobile station MS1 sets a transmission power level beyond that required for attenuation compensation, while the second mobile station MS2 sets its transmission power level to be lower. Thus, if both mobile stations MS1, MS2 make transmissions simultaneously in the random access channel RACH, this results in the base station BS receiving a power level for the components from the two mobile stations MS which means a considerably stronger power level for the first mobile station MS1 in comparison to that for the second mobile station MS2.

The transmissions from the first mobile station MS1 can thus be evaluated despite the collision. This, the second mobile station MS2 transmits repeatedly. The repetition is possibly carried out using a different transmission power level and a different time interval, which can be defined specifically and differently by each mobile station MS, in order to avoid another collision.

Some of the mobile stations MS, applications or services may not, however, select their transmission power levels randomly. A subset of the applications, mobile stations MS or services are prioritized (for example on the basis of the Quality of Service QoS) such that, for example, a raised transmission power level is used for the first transmission.

Figure 4:
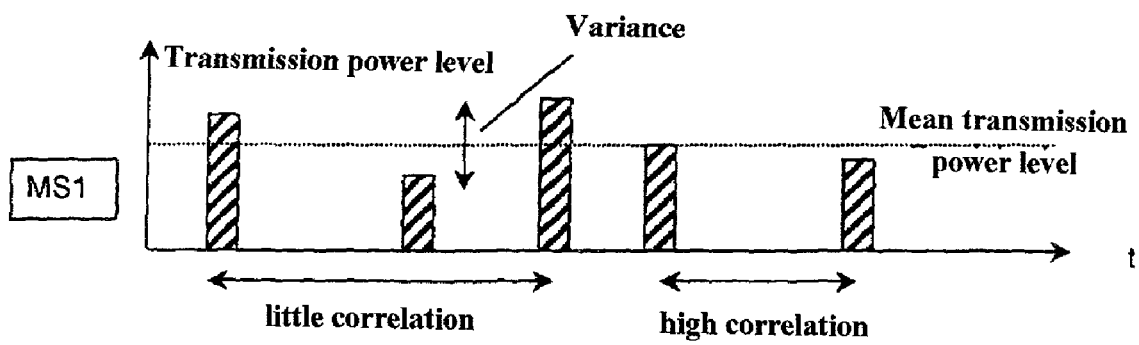
FIG. 4 shows a stochastic distribution of transmission power levels.

In comparison to a transmission power level related to the attenuation, the transmission power level selected by a mobile station MS1 may be less, equal to or greater, corresponding to a specific level, see FIG. 4. It is assumed that the mean transmission power level is constant over a certain time period, for example if the mobile station MS1 is not moving, then the successive transmissions from the mobile station MS1 are nevertheless not transmitted at a constant transmission power level. Within a predetermined variance, the mobile station MS1 can select the transmission power level arbitrarily, using a random principle.

The correlations between the transmission power levels in a number of transmissions may be low or high. Little correlation means that the transmission power levels of successive transmissions differ to a great extent. The transmission power level is controlled highly stochastically. If the correlations are higher, successive transmission power levels differ only slightly. The memory for the previous transmission power levels is taken into account to a greater extent. This configuration of the transmission power level adjustment then has a partially deterministic response.

Figure 5:
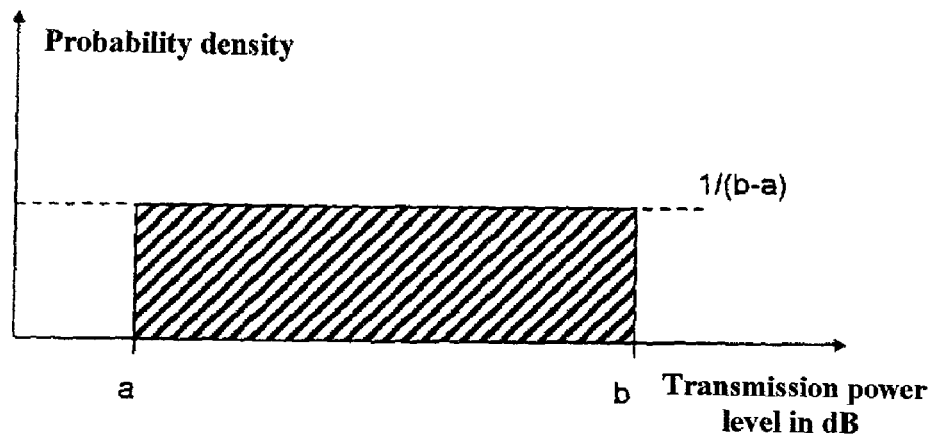
FIG. 5 shows an exemplary probability density for the transmission power level.

FIG. 5 shows one possible probability density of the transmission power level, with uniform distribution of the logarithmic transmission power level being proposed.

The invention claimed is:

1. A method for signal transmission in a random access channel in a radio communications system, comprising:
transmitting signals via a random access channel in an uncoordinated manner with an adjustable transmission power level, wherein
subscriber stations set the transmission power level, and
a mean transmission power level is predetermined for a random number generator which randomly sets the adjustable transmission power level dependent upon the predetermined mean transmission power level, wherein
the mean transmission power level is based on measured attenuation values in radio interface between a base station and the subscriber stations.

2. The method as claimed in claim 1, in which a random principle is used for a subset of the first transmissions in the signal transmission.

3. The method as claimed in claim 1, wherein the attenuation levels are determined by evaluating the transmitted power level in an organization channel.

4. The method as claimed in claim 1, wherein variance of the transmission power level in a number of transmission is predetermined for the random number generator which sets the transmission power level.

5. The method as claimed in claim 1, wherein a correlation coefficient for the transmission power levels of a number of successive transmissions from one of the subscriber stations is predetermined for a the random number generator which sets the transmission power level.

6. The method as claimed in claim 1, wherein the transmissions are sent as a request for allocation of radio resources, as an acknowledgement or as messages for updating a location of the subscriber stations.

7. The method as claimed in claim 1, wherein the random access channel is a broadband channel and is organized on the basis of one of a TDD or FDD mode in a UMTS mobile radio system.

8. A subscriber station for a radio communications system, the radio communications system having a random access channel which a number of subscriber stations use in an uncoordinated manner, comprising:
a transmission device for signal transmission in the random access channel, and
a control device which sets the transmission power level for the signal transmission on the basis of a random principle,
the mean transmission power level being predetermined for a random number generator which randomly sets the transmission power level dependent upon the predetermined mean transmission power level, wherein the mean transmission power level is based on measured attenuation values in radio interface between a base station and the subscriber stations.

9. A method for signal transmission in a random access channel in a radio communications system, comprising:
transmitting signals via a random access channel in an uncoordinated manner with an adjustable transmission power level, wherein
subscriber stations set the transmission power level, and a mean transmission power level is predetermined for a random number generator which randomly sets the transmission power level dependent upon the predetermined mean transmission power level, wherein the attenuation levels are determined by evaluating the transmitted power level in an organization channel.

* * * * *